(12) United States Patent
Liu et al.

(10) Patent No.: US 10,936,015 B2
(45) Date of Patent: Mar. 2, 2021

(54) ELECTRONIC DEVICE WITH MULTIPLE SCREENS

(71) Applicants: Yi-Hsun Liu, Taipei (TW); Hsiao-Wen Tseng, Taipei (TW); Yao-Hsien Yang, Taipei (TW); Jyh-Chyang Tzou, Taipei (TW)

(72) Inventors: Yi-Hsun Liu, Taipei (TW); Hsiao-Wen Tseng, Taipei (TW); Yao-Hsien Yang, Taipei (TW); Jyh-Chyang Tzou, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/853,757

(22) Filed: Apr. 21, 2020

(65) Prior Publication Data
US 2020/0363839 A1  Nov. 19, 2020

Related U.S. Application Data

(60) Provisional application No. 62/836,743, filed on Apr. 22, 2019.

(51) Int. Cl.
*G06F 1/16* (2006.01)

(52) U.S. Cl.
CPC .......... *G06F 1/1649* (2013.01); *G06F 1/165* (2013.01); *G06F 1/1616* (2013.01); *G06F 1/1654* (2013.01)

(58) Field of Classification Search
CPC ......... G06F 1/1647–165; G06F 1/1654; G06F 1/1669; G06F 1/1692

USPC ..................................................... 361/679.27
See application file for complete search history.

(56) References Cited

U.S. PATENT DOCUMENTS

| | | | | |
|---|---|---|---|---|
| 7,719,826 B1* | 5/2010 | Chang | .................... | G06F 1/1656 |
| | | | | 361/679.17 |
| 7,894,184 B2* | 2/2011 | Huang | .................. | G06F 1/1616 |
| | | | | 361/679.48 |
| 9,104,374 B2* | 8/2015 | Tsai | ...................... | G06F 1/1633 |
| 10,289,176 B1* | 5/2019 | Chen | .................... | G06F 1/1656 |
| 10,466,750 B2* | 11/2019 | Lee | ........................ | G06F 1/1688 |
| 10,656,673 B1* | 5/2020 | Su | .......................... | G06F 1/1669 |
| 2007/0153456 A1* | 7/2007 | Lin | ......................... | G06F 1/1616 |
| | | | | 361/679.04 |
| 2011/0188187 A1* | 8/2011 | Barnett | ................. | G06F 1/1666 |
| | | | | 361/679.01 |
| 2014/0049891 A1* | 2/2014 | Lee | ........................ | G06F 1/1662 |
| | | | | 361/679.15 |

(Continued)

*Primary Examiner* — Anthony Q Edwards
(74) *Attorney, Agent, or Firm* — JCIPRNET

(57) ABSTRACT

An electronic device with multiple screens includes a first body, a second body, a keyboard, and at least one expansion module. The first body has a sliding rail assembly, a first end and a second end. The second body is rotatably connected to the first end of the first body. The sliding base is slidably connected to the sliding rail assembly of the first body. The lifting base is pivotally connected to one side of the keyboard facing the first end and is slidably connected to the sliding rail assembly. The at least one expansion module is detachably connected to the lifting base and is disposed between the second body and the keyboard. When the keyboard slides toward the second body, the sliding base is driven to move along the sliding rail assembly and away from the second end of the first body.

16 Claims, 11 Drawing Sheets

(56) References Cited

U.S. PATENT DOCUMENTS

| | | | |
|---|---|---|---|
| 2014/0375530 A1* | 12/2014 | Delaporte | G06F 1/1649 |
| | | | 345/1.3 |
| 2018/0188774 A1* | 7/2018 | Ent | G06F 1/1618 |
| 2018/0343760 A1* | 11/2018 | Lee | G06F 1/1632 |
| 2019/0258300 A1* | 8/2019 | Gerardi | G06F 1/1632 |
| 2020/0142456 A1* | 5/2020 | Hsu | G06F 1/1681 |
| 2020/0249726 A1* | 8/2020 | Brocklesby | G06F 1/1624 |
| 2020/0285273 A1* | 9/2020 | Liang | G06F 1/1616 |
| 2020/0319679 A1* | 10/2020 | Knoppert | G06F 1/1669 |
| 2020/0341515 A1* | 10/2020 | Moser | G06F 1/1643 |

\* cited by examiner

ELECTRONIC DEVICE WITH MULTIPLE SCREENS

CROSS-REFERENCE TO RELATED APPLICATION

This application claims the priority benefit of U.S. provisional application Ser. No. 62/836,743, filed on Apr. 22, 2019. The entirety of the above-mentioned patent application is hereby incorporated by reference herein and made a part of specification.

BACKGROUND

Field of the Disclosure

The disclosure relates to an electronic device, and in particular to an electronic device with multiple screens and switchable use modes.

Description of Related Art

Conventional notebook computer is composed of a display body and a host. Therefore, the image picture is limited to the size of the display body. In addition, the functions of the existing display body are mostly limited to image display only. In light of the above, an external screen has been developed, which can be connected to one side of the display body to enlarge the display range of picture. However, the drawback of the external screen is that it is bulky and not easy to carry, and the external screen is typically disposed at the edges of both sides of the display body, which causes the shift of the center of gravity and the viewing angle of the notebook computer, and thus making it unergonomic. In addition, there will be an obvious segment between the external screen and the display body, which will affect the picture display effect.

Therefore, it has become an important goal to develop a notebook computer which has a large display area while being easy to adjust and install and can solve image segmentation problem.

SUMMARY OF THE DISCLOSURE

The disclosure provides an electronic device with multiple screens, which can adjust the position of the expansion module according to needs, so as to achieve the effect of enlarging the display range and solve image segmentation problem.

The electronic device with multiple screens of the disclosure includes a first body, a second body, a keyboard, and at least one expansion module. The first body has a sliding rail assembly, a first end and a second end. The second body is rotatably connected to the first end of the first body. The keyboard has a sliding base and a lifting base. The sliding base is slidably connected to the sliding rail assembly of the first body. The lifting base is pivotally connected to one side of the keyboard facing the first end and is slidably connected to the sliding rail assembly. The at least one expansion module is detachably connected to the lifting base and is disposed between the second body and the keyboard. When the keyboard slides toward the second body, the sliding base is driven to move along the sliding rail assembly and away from the second end of the first body. The lifting base moves along the sliding rail assembly and rotates relative to the sliding base to lift the at least one expansion module relative to the first body.

Based on the above, the electronic device with multiple screens of the disclosure has a slidable keyboard. When the keyboard is pushed toward the second body (such as the main screen), it can simultaneously drive the at least one expansion module (such as the sub-screen) to lift, such that the at least one expansion module becomes the image extension of the second body, thereby achieving the effect of narrowing the frame and enlarging the display range. In addition, the expansion module can cover the outer frame of the second body to avoid segmentation during the display process.

Further, the at least one expansion module can be separated from the first body and used independently, and has better practicability.

DESCRIPTION OF EMBODIMENTS

Figure 1A:
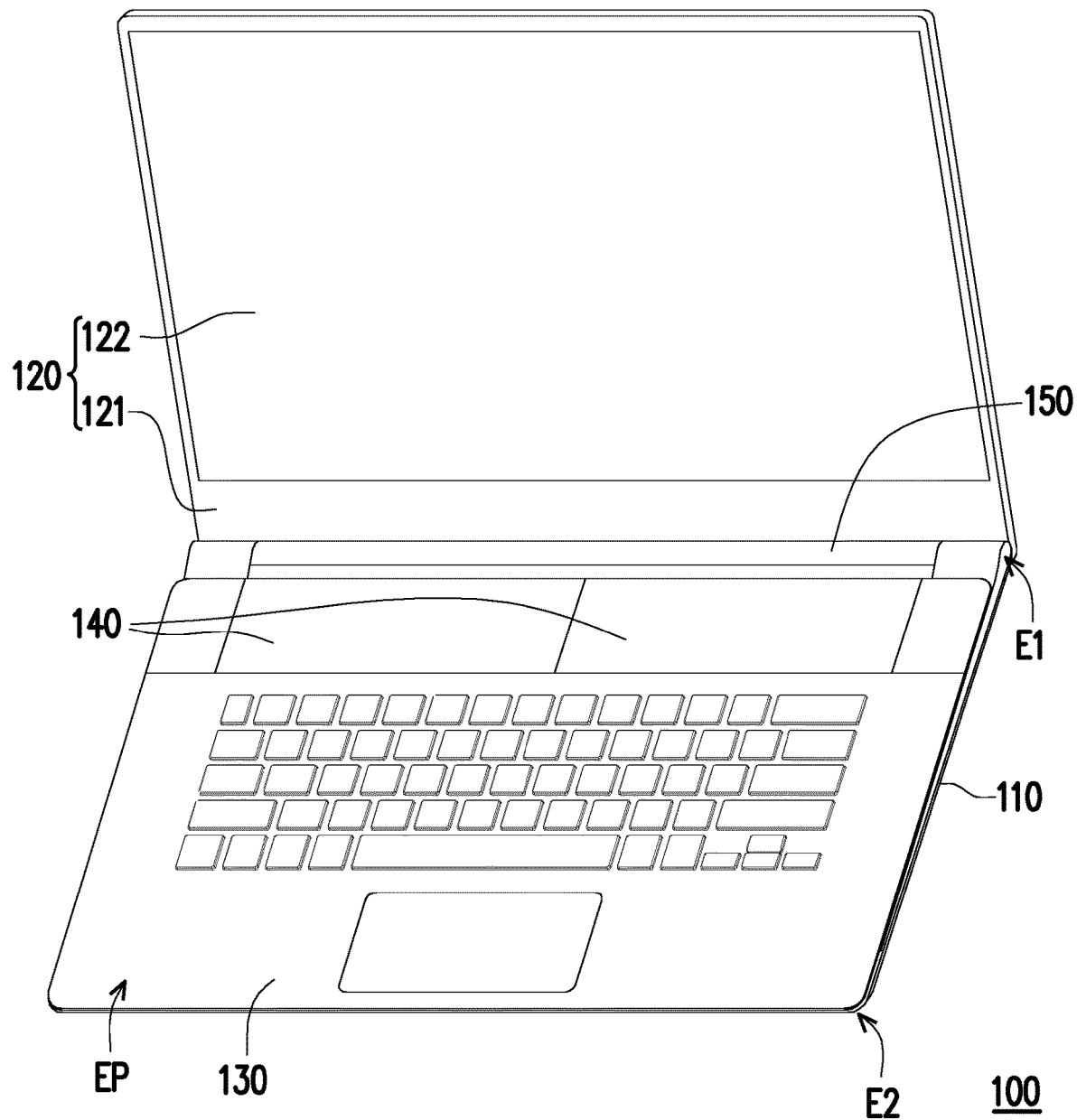
FIG. 1A is a schematic perspective view of an electronic device with multiple screens in a normal mode according to an embodiment of the disclosure.
Figure 1B:
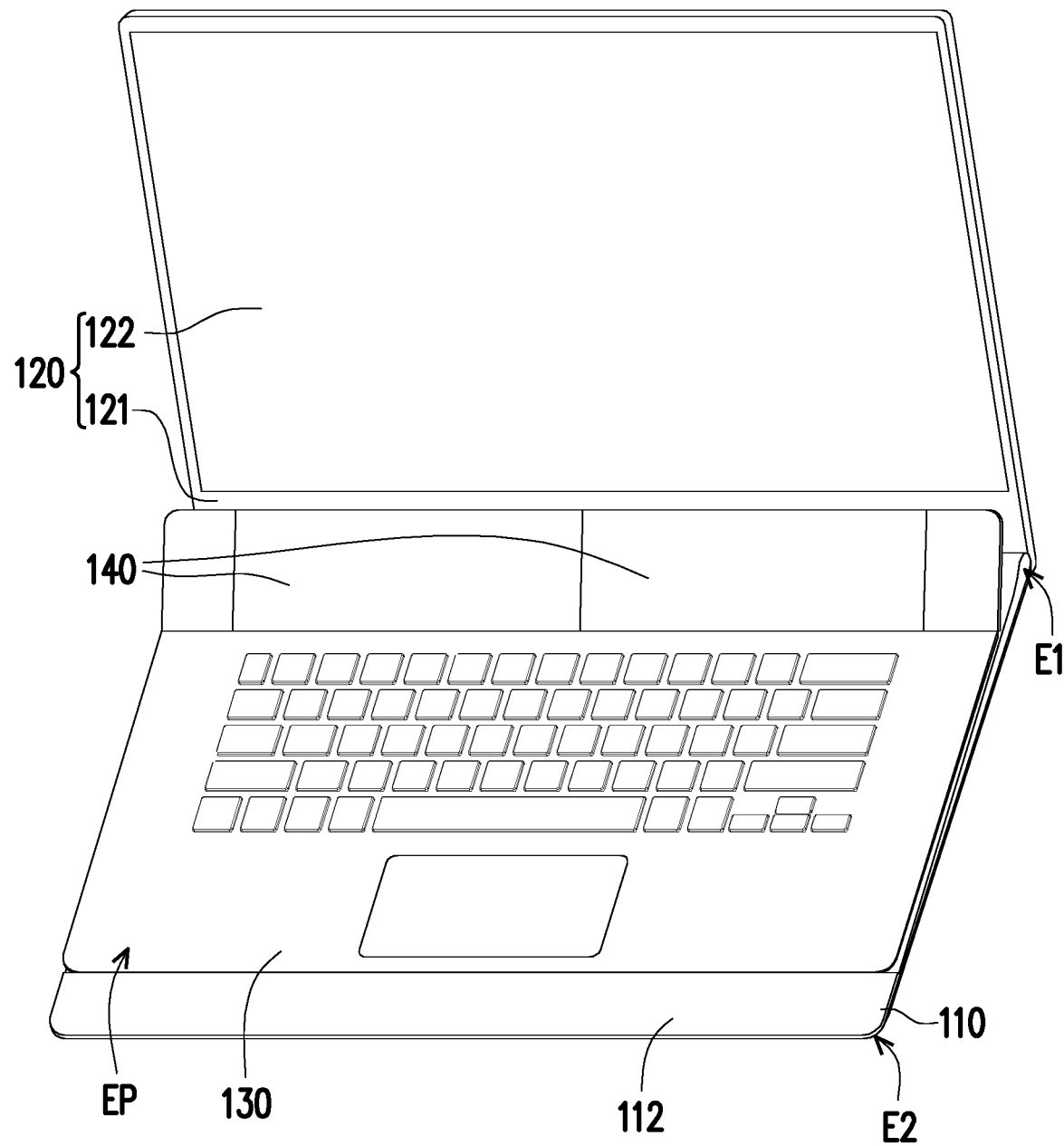
FIG. 1B is a schematic perspective view of the electronic device with multiple screens of FIG. 1A in a lifting mode.
Figure 1C:
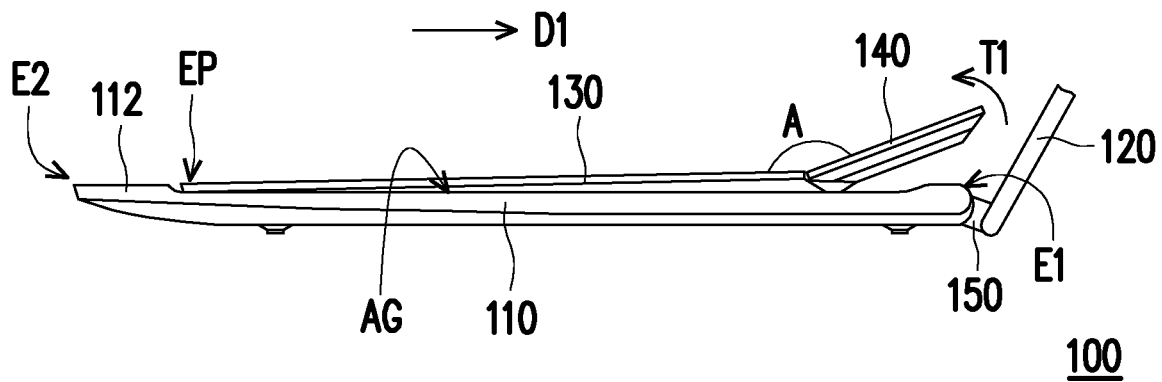
FIG. 1C is a schematic side view of the electronic device with multiple screens of FIG. 1B in the lifting mode.
Figure 1D:
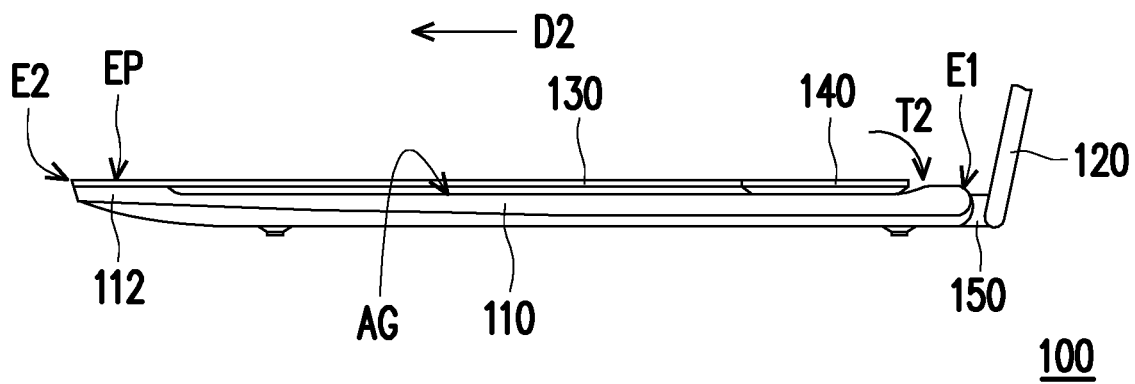
FIG. 1D is a schematic side view of the electronic device with multiple screens of FIG. 1A in the normal mode.

FIG. 1A is a schematic perspective view of an electronic device with multiple screens in a normal mode according to an embodiment of the disclosure. FIG. 1B is a schematic perspective view of the electronic device with multiple screens of FIG. 1A in a lifting mode. FIG. 1C is a schematic side view of the electronic device with multiple screens of FIG. 1B in the lifting mode. FIG. 1D is a schematic side view of the electronic device with multiple screens of FIG. 1A in the normal mode.

Please refer to FIG. 1A to FIG. 1D, the electronic device 100 with multiple screens of the disclosure includes a first body 110, a second body 120, a keyboard 130 and at least one expansion module 140. The first body 110 is, for example, a host and equipped with various electronic components. The first body 110 has a sliding rail assembly 111, a first end E1, and a second end E2. The sliding rail assembly 111 is fixed in the inner space of the first body 110. The second body 120 is, for example, a main screen and is configured to display images or pictures, and the second body 120 is rotatably connected to the first end E1 of the first body 110. For example, a pivot module 150 is disposed between the first body 110 and the second body 120 to facilitate opening or closing of the first body 110 and the second body 120.

Figure 2A:
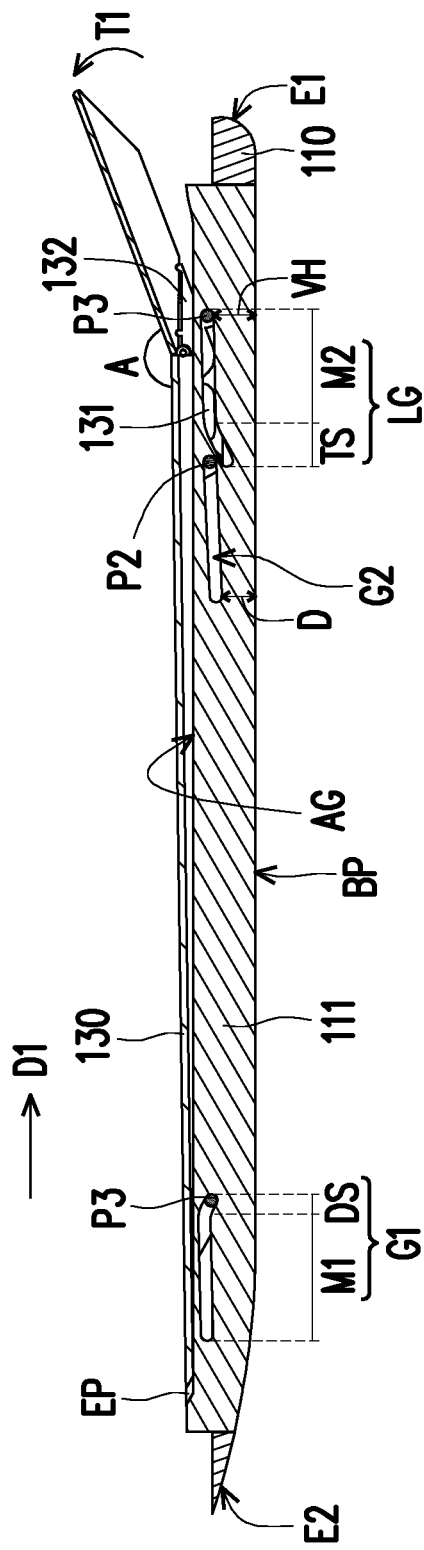
FIG. 2A is a schematic side view of some components of the electronic device with multiple screens of FIG. 1A in the normal mode.
Figure 2B:
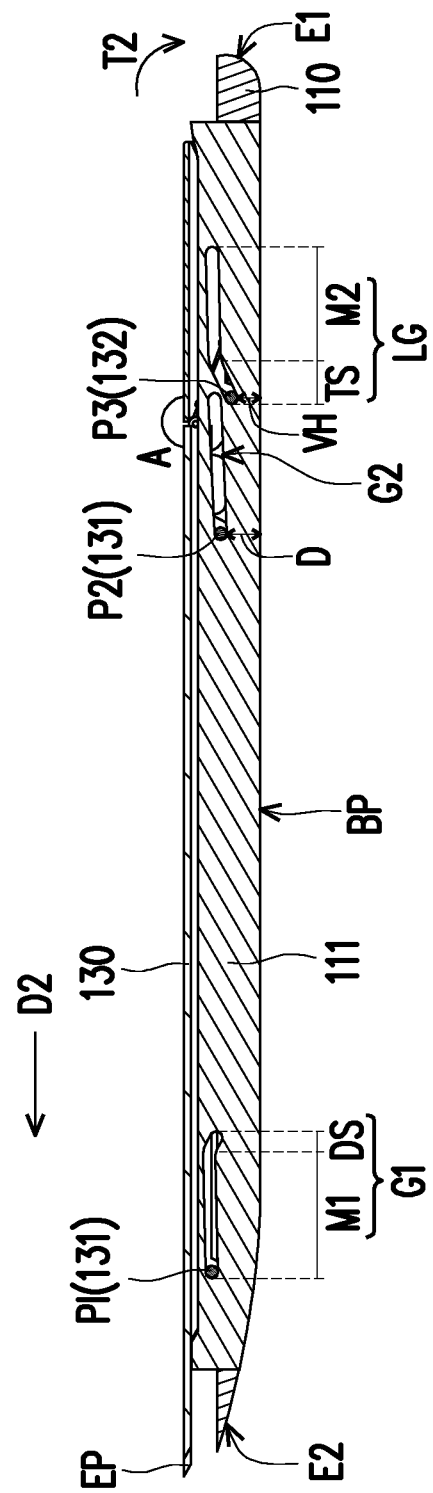
FIG. 2B is a schematic side view of some components of the electronic device with multiple screens of FIG. 1B in the lifting mode.
Figure 2C:
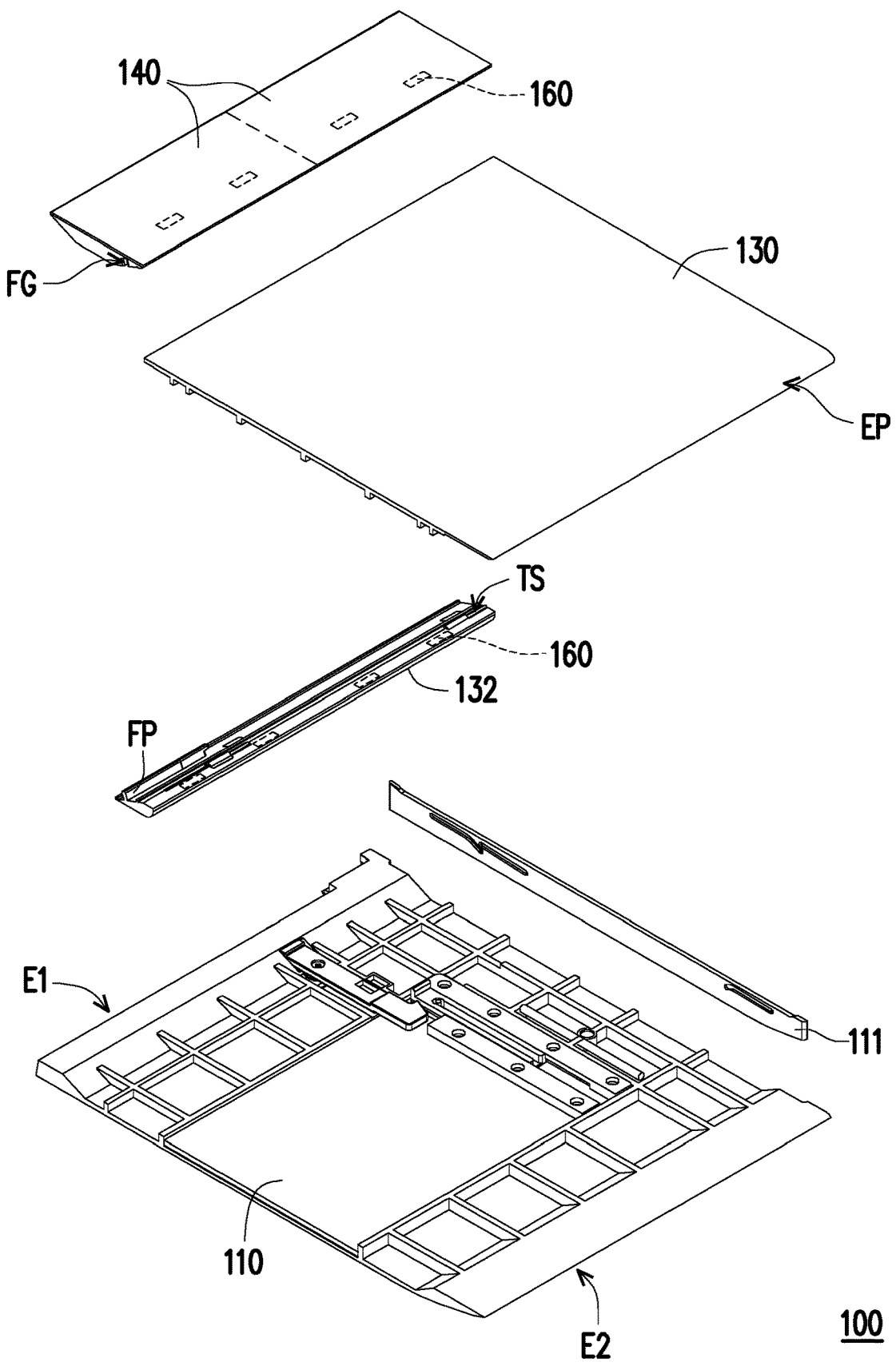
FIG. 2C is an exploded perspective view of some components of the electronic device with multiple screens of FIG. 2A.
Figure 2D:
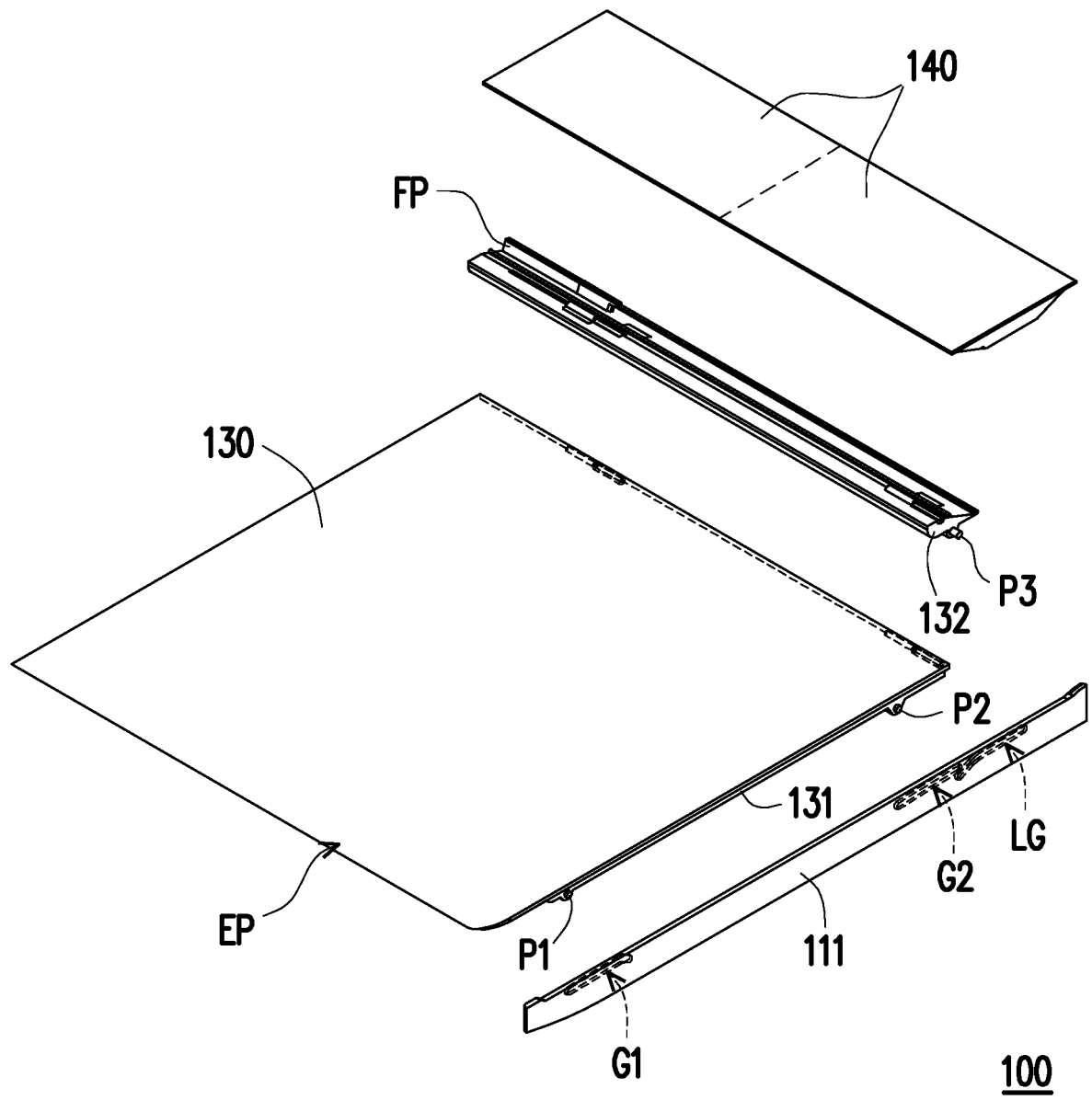
FIG. 2D is an exploded perspective view of some components of the electronic device with multiple screens of FIG. 2C at another angle.

FIG. 2A is a schematic side view of some components of the electronic device with multiple screens of FIG. 1A in the normal mode. FIG. 2B is a schematic side view of some components of the electronic device with multiple screens of FIG. 1B in the lifting mode. FIG. 2C is an exploded perspective view of some components of the electronic device with multiple screens of FIG. 2A. FIG. 2D is an exploded perspective view of some components of the electronic device with multiple screens of FIG. 2C at another angle.

With reference to FIG. 2A and FIG. 2C, the keyboard 130 is configured to input instructions and has a sliding base 131 and a lifting base 132. The sliding base 131 is fixed on the bottom surface of the keyboard 130 and is slidably connected to the sliding rail assembly 111 of the first body 110. The lifting base 132 is pivotally connected to one side of the keyboard 130 facing the first end E1 and is slidably connected to the sliding rail assembly 111. For example, the lifting base 132 is pivotally connected to the two rotating bases B of the keyboard 130 through two rotating shafts P. The at least one expansion module 140 is detachably connected to the lifting base 132 of the keyboard 130 and is disposed between the second body 120 and the keyboard 130.

Further, each of the expansion modules 140 has an engaging slot FG, and the lifting base 132 has an engaging member FP. The engaging member FP of the lifting base 132 and the engaging slot FG of each of the expansion modules 140 are engaged with each other, and each of the expansion modules 140 is adapted to be engaged with or separated from each other along the top surface TS of the lifting base 132. Referring to FIG. 2C, the electronic device 100 with multiple screens further includes a plurality of magnetic members 160, which are respectively disposed at each of the expansion modules 140 and the lifting base 132. When the lifting base 132 and each of the expansion modules 140 are engaged with each other, the plurality of magnetic members 160 at corresponding positions are magnetically attracted to each other, so as to achieve a positioning effect.

In this embodiment, the number of the at least one expansion module 140 is two. The two expansion modules 140 are, for example, a combination of a display screen, a memory, a mouse, a hard disk, or a speaker. Two detachable display screens are shown in the figure. In other embodiments, the at least one expansion module 140 is, for example, a display screen, a memory, a mouse, a hard disk, or a speaker.

Referring to FIG. 1A and FIG. 1B, when the expansion module 140 is a display screen, it can be used as an extension of the picture in the main screen, which can replace the function keys of the keyboard and be used to display built-in applications such as: calendar/music player/voice assistant and program toolbar. The display screen can also be equipped with a microphone and have a voice control function, or adopt a touch panel to perform a touch function.

In addition, the second body 120 (main screen) and the two expansion modules 140 (two display screens) can be used to combine or separately display the video screen, for example, in the full-range display of the second body 120 (main screen) and the two expansion modules 140 (two display screens) or a small-range display of one of the expansion modules 140, so that the second body 120 and the other expansion module 140 that do not perform display can be used to display other working pictures. The user can freely select the display position (the first body or two expansion modules) and the second body 120 as well as the two expansion modules 140 are provided with front lenses, which can be freely selected by the user.

Referring to FIG. 2B and FIG. 1C, when the keyboard 130 slides toward the second body 120, the sliding base 131 is driven to move along the sliding rail assembly 111 and away from the second end E2 of the first body 110, and the lifting base 132 moves along the sliding rail assembly 111 and rotates relative to the sliding base 131 in a first rotation direction T1, thereby lifting the at least one expansion module 140 relative to the first body 110.

Referring to FIG. 2A and FIG. 1D, when the keyboard 130 is away from the second body 120, the sliding base 131 is driven to move along the sliding rail assembly 111 and away from the first end E1 of the first body 110, and the lifting base 132 moves along the sliding rail assembly 111 and rotates relative to the sliding base 131 in a second rotation direction T2 opposite to the first rotation direction T1, so that the at least one expansion module 140 is relatively close to the first body 110.

Referring to FIG. 1B and FIG. 1C, the first body 110 has a palm rest 112 and a receiving slot AG. The palm rest 112 is formed at the second end E2 of the first body 110 and the receiving slot AG is recessed and formed between the first end E1 and the second end E2 of the first body 110. An end portion EP of the keyboard 130 away from the second body 120 is adapted to enter the receiving slot AG and aligned with the palm rest 112, the end portion EP and the palm rest 112 may form a seamless area for the user to place his/her hands.

Referring to FIG. 2A to FIG. 2D, the sliding rail assembly 111 has a first moving slot G1, a second moving slot G2 and a lifting slot LG, the first moving slot G1 is formed on the side wall surface of the sliding rail assembly 111 and close to the second end E2 of the first body 110. The second moving slot G2 is obliquely formed on the side wall surface of the sliding rail assembly 111. A distance D of the second moving slot G2 relative to a bottom portion BP of the sliding rail assembly 111 extends toward the first end E1 of the first body 110 and gradually increases. The lifting slot LG is close to the first end E1 of the first body 110, and the second moving slot G2 is disposed between the first moving slot G1 and the lifting slot LG. The sliding base 131 has a first driving rod P1 and a second driving rod P2, the first driving rod P1 is disposed through the first moving slot G1 of the sliding rail assembly 111, and the second driving rod P2 is disposed through the second moving slot G2. The lifting base 132 has a third driving rod P3, which is disposed through the lifting slot LG of the sliding rail assembly 111.

In detail, the first moving slot G1 has a first translating section M1 and a sinking section DS, the first driving rod P1 is adapted to move from the first translating section M1 to the sinking section DS, so that the end portion EP of the keyboard 130 translates along the palm rest 112 of the first body 110 and enters the receiving slot AG, and the second driving rod P2 also moves obliquely along the second moving slot G2 simultaneously. The lifting slot LG has a rising section TS and a second translating section M2. The third driving rod P3 of the lifting base 132 moves along the rising section TS and faces the first end E1 of the first body 110, so that the lifting base 132 rotates toward the first rotation direction T1. The lifting base 132 drives the at least one expansion module 140 to move away from the receiving slot AG, and the expansion module 140 and the keyboard 130 form an angle A. In addition, the rising section TS of the lifting slot LG is partially located below the second moving slot G2 and the second translating section M2 is adjacent to the first end E1 of the first body 110.

The following briefly describes the operation flow of the electronic device 100 with multiple screens switching between the normal mode and the lifting mode.

Referring to FIG. 1A, FIG. 1D, and FIG. 2A, in the normal mode, the end EP of the keyboard 130 is stacked on the palm rest 112 of the first body 110, and the lifting base 132 rotates toward the second rotation direction T2 to drive each of the expansion modules 140 to be located in the receiving slot AG, and forms an angle A of 180 degrees with the keyboard 130. The first driving rod P1 and the second driving rod P2 of the sliding base 131 respectively move in a second direction D2 in the first moving slot G1 and the second moving slot G2, so as to be relatively close to the second end E2 of the first body 110. The third driving rod P3 of the lifting base 132 moves in the second direction D2 and enters the rising section TS from the second translating section M2 to reduce the vertical height VH of the third driving rod P3 relative to the bottom portion BP of the sliding rail assembly 111.

Referring to FIG. 1B, FIG. 1C, and FIG. 2B, in the lifting mode, the end portion EP of the keyboard 130 is disposed in the receiving slot AG of the first body 110 and closely matches with the palm rest 112, forming a segment-free effect. The lifting base 132 rotates toward the first rotation direction T1 to drive each of the expansion modules 140 to move away from the receiving slot AG, and forms the angle A less than 180 degrees with the keyboard 130. In addition, each of the expansion modules 140 is adapted to cover the outer frame 121 of the second body 120 and overlap with the display panel 122 of the second body 120 to form an extended picture of the display panel 122. The first driving rod P1 and the second driving rod P2 of the sliding base 131 respectively move in the first direction D1 in the first moving slot G1 and the second moving slot G2, so as to be relatively close to the first end E1 of the first body 110. The third driving rod P3 of the lifting base 132 moves in the first direction D1 and enters the second translating section M2 from the rising section TS to raise the vertical height VH of the third driving rod P3 relative to the bottom portion BP of the sliding rail assembly 111.

Figure 3:
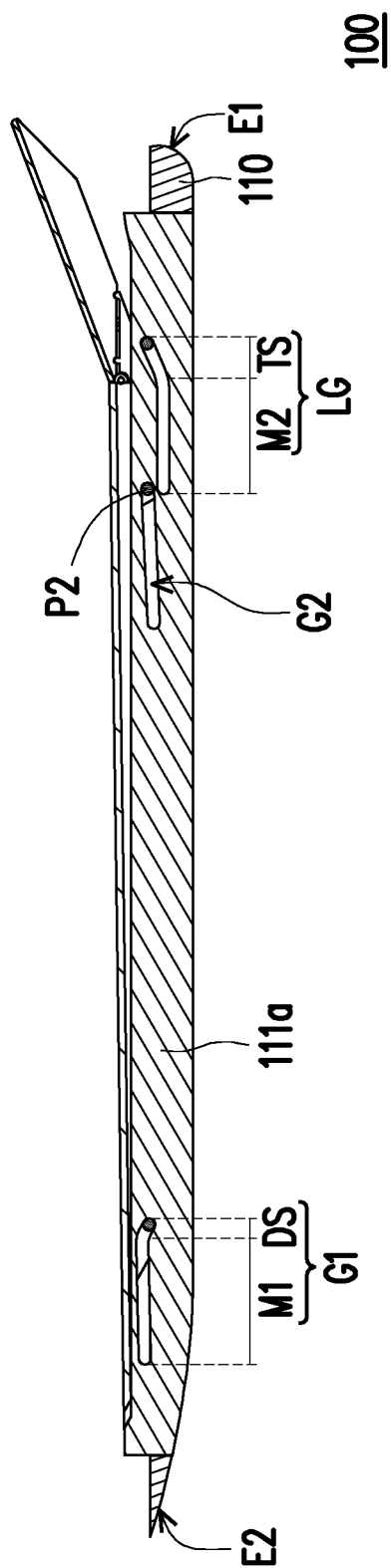
FIG. 3 is a schematic plan view of the electronic device with multiple screens of FIG. 1A adopting the sliding rail assembly of another embodiment.

FIG. 3 is a schematic plan view of the electronic device with multiple screens of FIG. 1A adopting the sliding rail assembly of another embodiment. Referring to FIG. 3, the sliding rail assembly 111a of this embodiment is different from the sliding rail assembly 111 shown in FIG. 2A, the difference is that the lifting slot LG of the sliding rail assembly 111a has a rising section TS and a second translating section M2, and the second translating section M2 is partially located below the second moving slot G2 and the rising section TS is adjacent to the first end E1 of the first body 110.

Figure 4A:
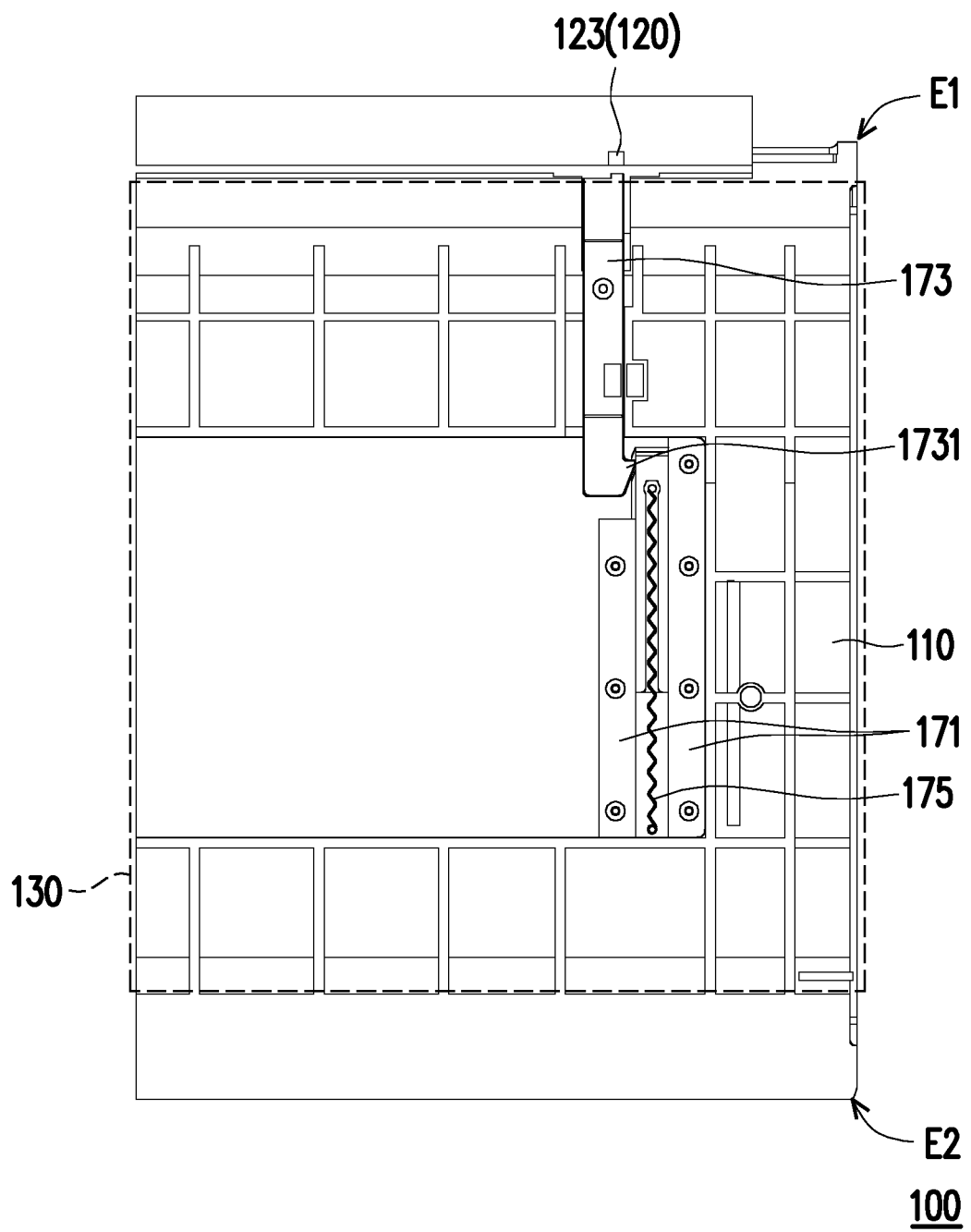
FIG. 4A is a schematic view of an engagement state of an electronic device with multiple screens combined with a restoring member according to the disclosure.
Figure 4B:
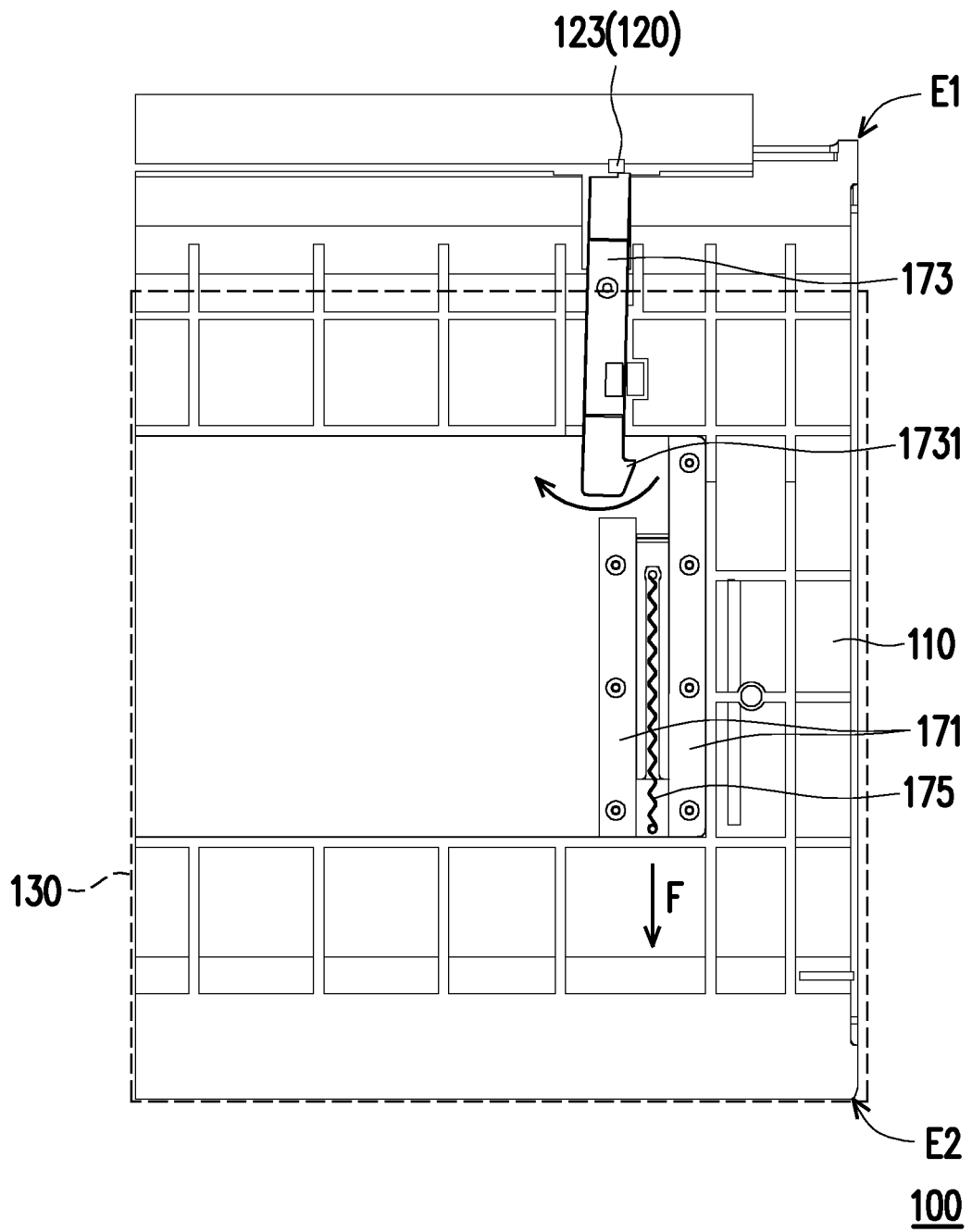
FIG. 4B is a schematic view of the unlocking state of the restoring member of FIG. 4A.
Figure 4C:
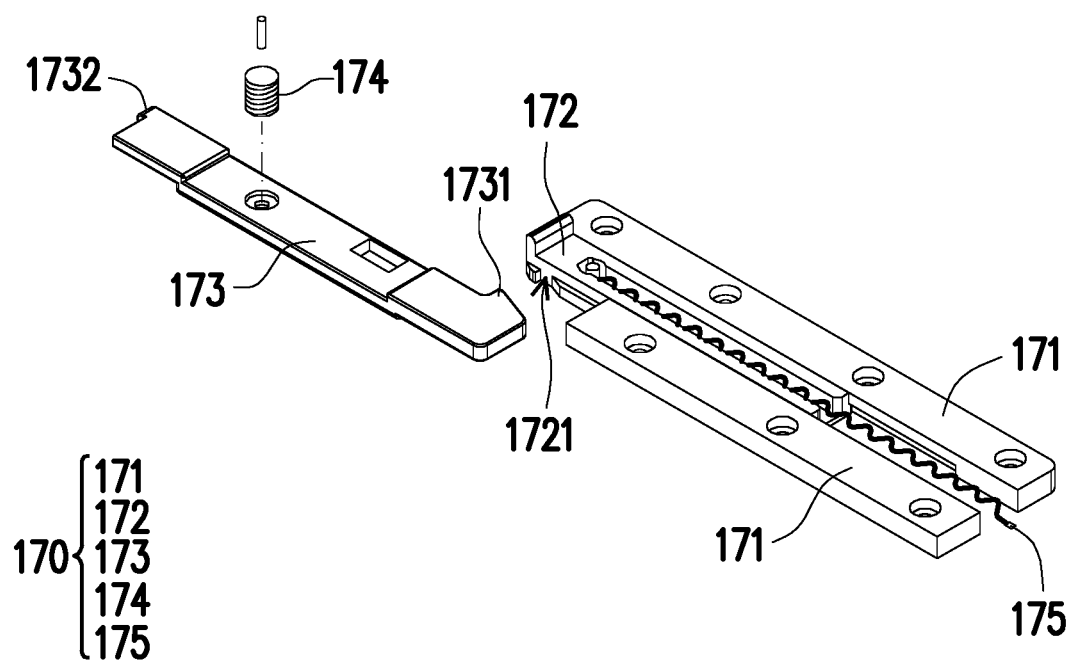
FIG. 4C is an exploded perspective view of the restoring member of FIG. 4A.

FIG. 4A is a schematic view of an engagement state of an electronic device with multiple screens combined with a restoring member according to the disclosure. FIG. 4B is a schematic view of the unlocking state of the restoring member of FIG. 4A. FIG. 4C is an exploded perspective view of the restoring member of FIG. 4A.

Referring to FIG. 4A to FIG. 4C, the electronic device 100 with multiple screens includes a restoring member 170, which is disposed in the first body 110 and connected to the keyboard 130. When the second body 120 rotates toward the first body 110 (toward the first direction of rotation T1), the second body 120 is adapted to unlock the restoring member 170 so that the keyboard 130 slides along the sliding rail assembly 111 to cover the second end E2 of the first body 110.

Referring to FIG. 4A and FIG. 4C, the restoring member 170 has two stroke levers 171, a sliding linkage 172, a position-limiting linkage 173, a torsion spring 174, and an elastic member 175.

The two stroke levers 171 are fixed in the first body 110 and spaced apart from each other in parallel. The sliding linkage 172 is slidably arranged between the two stroke levers 171. The position-limiting linkage 173 is pivotally connected to the first body 110. The torsion spring 174 is disposed in the position-limiting linkage 173 and drives the position-limiting linkage 173 to be engaged with the sliding linkage 172. In addition, the position-limiting linkage 173 has a hook 1731, and the sliding linkage 172 has a recess 1721. The hook 1731 and the recess 1721 are adapted to engage with each other. Both ends of the elastic member 175 are respectively connected to the sliding linkage 172 and the first body 110 and provide an elastic force F toward the second end E2 of the first body 110. The second body 120 has a pushing block 123 aligned with a protrusion 1732 of the position-limiting linkage 173.

With reference to FIG. 1C and FIG. 4A, when the first body 110 and the second body 120 are opened with respect to each other to a specific angle, the pushing block 123 is away from the protrusion 1732 of the position-limiting linkage 173, so that the position-limiting linkage 173 is restricted by the torsion spring 174 and thus being engaged with the sliding linkage 172. In this state, the sliding linkage 172 stretches the elastic member 175 to accumulate the elastic force F.

With reference to FIG. 1A and FIG. 4B, when the second body 120 and the first body 110 are closed with respect to each other and smaller than a certain angle, the pushing block 123 abuts against the protrusion 1732 of the position-limiting linkage 173 and pushes the position-limiting linkage 173 to pivot relative to the first body 110 to resist the torsion force of the torsion spring 174, so that the hook 1731 of the position-limiting linkage 173 is separated from the recess 1721 of the sliding linkage 172. After the position-limiting linkage 173 releases the limit on the sliding linkage 172, the elasticity of the elastic member 175 recovers and generates the elastic force F to simultaneously drive the sliding linkage 172 and the keyboard 130 to move toward the second end E2 of the first body 110. Finally, the end portion EP of the keyboard 130 is stacked on the palm rest 112 of the first body 110.

Figure 5A:
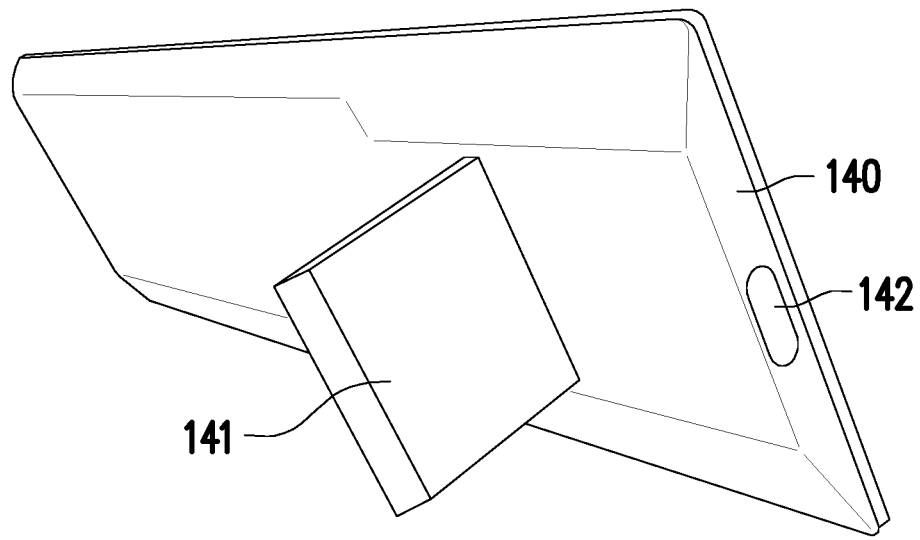
FIG. 5A is a schematic perspective view of one of the expansion modules of FIG. 1B.
Figure 5B:
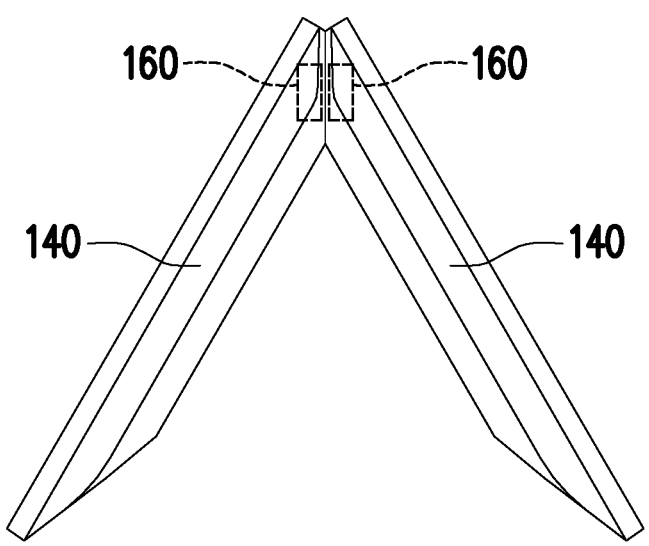
FIG. 5B is a schematic plan view of the two expansion modules of FIG. 1B magnetically attracted to each other.

FIG. 5A is a schematic perspective view of one of the expansion modules of FIG. 1B. FIG. 5B is a schematic plan view of the two expansion modules of FIG. 1B magnetically attracted to each other.

Referring to FIG. 1B and FIG. 5A, each of the expansion modules 140 has a foldable stand 141 and a connection port 142. The foldable stand 141 is disposed on a bottom surface BS of the expansion module 140. The foldable stand 141 can be attached to the bottom surface BS to facilitate hand-holding or carrying, or the foldable stand 141 is unfolded relative to the bottom surface and configured to support independently on a flat surface. The connection port 142 is disposed on one side surface of the expansion module 140. The connection port 142 is, for example, a Pogo Pin, Type C, or similar connection interface. When the expansion module 140 is disposed at the first body 110, the connection port 142 is adapted to couple the power supply and the computing core of the first body 110, so that the first body 110 can supply power and transmit data to the expansion module 140. When the expansion module 140 is separated from the first body 110, the connection port 142 is adapted to be coupled to an external power supply to facilitate charging.

Referring to FIG. 1B and FIG. 5B, the at least one expansion module 140 includes two display screens, and the two expansion modules 140 separated from the first body 110 are adapted to operate alone or together. When the two expansion modules 140 are disassembled from the lifting base 132, the plurality of magnetic members 160 of the two expansion modules 140 are adapted to attract each other magnetically to form a triangular structure. In this use mode, the two expansion modules 140 are configured to be placed on the plane, and display information in different directions.

In summary, the electronic device with multiple screens of the disclosure has a slidable keyboard, when the keyboard is pushed toward the second body (such as the main screen), it can simultaneously drive at least one expansion module (such as the sub-screen) to lift, such that the at least one expansion module becomes the image extension of the second body, thereby achieving the effect of narrowing the frame and enlarging the display range. In addition, the expansion module can cover the outer frame of the second body to avoid segmentation during the display process.

Further, the at least one expansion module can be separated from the first body and used independently, and has better practicability.

What is claimed is:

1. An electronic device with multiple screens, comprising:
   a first body having a sliding rail assembly, a first end and a second end;
   a second body rotatably connected to the first end of the first body;
   a keyboard having a sliding base and a lifting base, wherein the sliding base is slidably connected to the sliding rail assembly of the first body, the lifting base is pivotally connected to one side of the keyboard facing the first end and is slidable connected to the sliding rail assembly; and
   at least one expansion module detachably connected to the lifting base and disposed between the second body and the keyboard,
   wherein, when the keyboard slides towards the second body, the sliding base is driven to move along the sliding rail assembly and away from the second end of the first body, the lifting base moves along the sliding rail assembly and rotates relative to the sliding base to lift the at least one expansion module relative to the first body.

2. The electronic device with multiple screens according to claim 1, wherein the first body has a palm rest and a receiving slot, the palm rest is formed at the second end of the first body, and the receiving slot is formed between the first end and the second end, an end portion of the keyboard away from the second body is adapted to enter the receiving slot and aligned with the palm rest.

3. The electronic device with multiple screens according to claim 2, wherein the sliding rail assembly has a first moving slot and a lifting slot, the sliding base has a first driving rod disposed through the first moving slot, the lifting base has a third driving rod disposed through the lifting slot.

4. The electronic device with multiple screens according to claim 3, wherein the first moving slot has a first translating section and a sinking section, and the first driving rod is adapted to move from the first translating section to the sinking section, so that the keyboard translates along the palm rest and enters the receiving slot, the lifting slot has a rising section and a second translating section, and the third driving rod moves along the rising section such that the at least one expansion module moves away from the receiving slot and forms an angle with the keyboard.

5. The electronic device with multiple screens according to claim 3, wherein the lifting slot has a rising section and a second translating section, the rising section or the second translating section are adjacent to the first end of the first body.

6. The electronic device with multiple screens according to claim 3, wherein the sliding rail assembly has a second moving slot disposed between the first moving slot and the lifting slot, and the sliding base has a second driving rod disposed through the second moving slot.

7. The electronic device with multiple screens according to claim 6, wherein the second moving slot is formed obliquely at the sliding rail assembly, and a vertical height of the second moving slot relative to a bottom portion of the sliding rail assembly extends toward the first end and gradually increases.

8. The electronic device with multiple screens according to claim 1, further comprising a restoring member disposed in the first body and connected to the keyboard, and when the second body rotates toward the first body, the second body is adapted to unlock the restoring member, so that the keyboard slides along the sliding rail assembly to cover the second end of the first body.

9. The electronic device with multiple screens according to claim 8, wherein the restoring member has two stroke levers, a sliding linkage, a position-limiting linkage, a torsion spring, and an elastic member, and the two stroke levers are fixed in the first body and spaced apart from each other, the sliding linkage is slidably arranged between the two stroke levers, the position-limiting linkage is pivotally connected to the first body, the torsion spring is arranged in the position-limiting linkage and drives the position-limiting linkage to be engaged with the sliding linkage, and both ends of the elastic member are respectively connected to the sliding linkage and the first body and provide an elastic force toward the second end.

10. The electronic device with multiple screens according to claim 9, wherein the second body has a pushing block aligned with the position-limiting linkage, and when the first body and the second body are opened with respect to each other to an angle, the pushing block moves away from the position-limiting linkage, and when the second body and the first body are closed with respect to each other and smaller than the angle, the pushing block drives the position-limiting linkage to be separated from the sliding linkage.

11. The electronic device with multiple screens according to claim 9, wherein the position-limiting linkage has a hook, and the sliding linkage has a recess, and the hook and the recess are adapted to be engaged with each other.

12. The electronic device with multiple screens according to claim 1, wherein the at least one expansion module has an engaging slot, and the lifting base has an engaging member, and the engaging member and the engaging slot are engaged with each other.

13. The electronic device with multiple screens according to claim 1, further comprising a plurality of magnetic members respectively disposed at the at least one expansion module and the lifting base, and the corresponding magnetic members are magnetically attracted to each other.

14. The electronic device with multiple screens according to claim 13, wherein the number of the at least one expansion module is two, and when the expansion modules are detached from the lifting base, the expansion modules are adapted to magnetically attract each other to form a triangular structure.

15. The electronic device with multiple screens according to claim 13, wherein the at least one expansion module has a foldable stand and a connection port, the foldable stand is disposed on a bottom surface of the at least one expansion module, and the connection port is arranged on one side surface of the at least one expansion module.

16. The electronic device with multiple screens according to claim 1, wherein the at least one expansion module comprises a memory, a mouse, a display screen, a hard disk, or a speaker.

\* \* \* \* \*